W. F. DAY.
BURNER.
APPLICATION FILED JULY 9, 1915.

1,163,221.

Patented Dec. 7, 1915.
2 SHEETS—SHEET 1.

WITNESSES

INVENTOR
WILBUR F. DAY
BY
ATTORNEYS

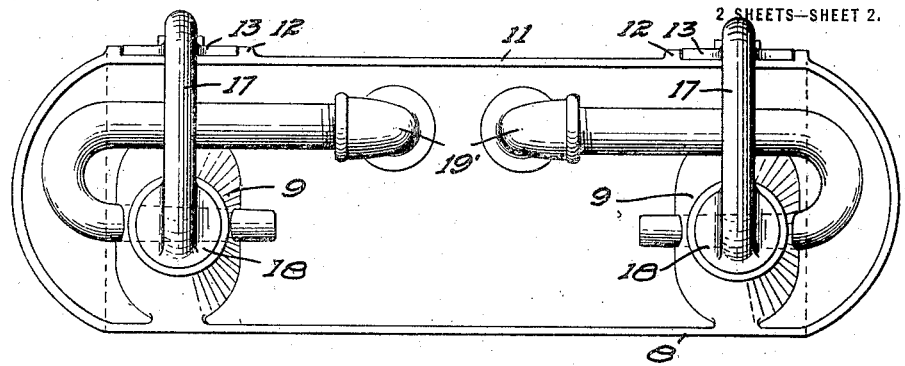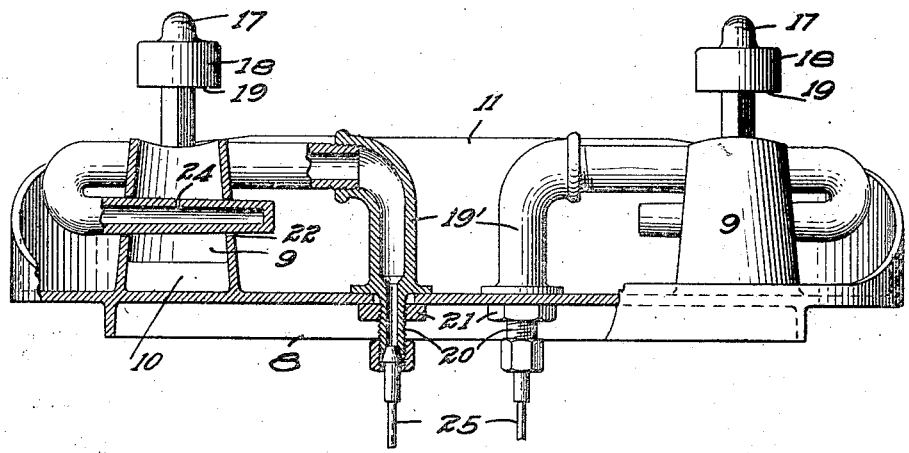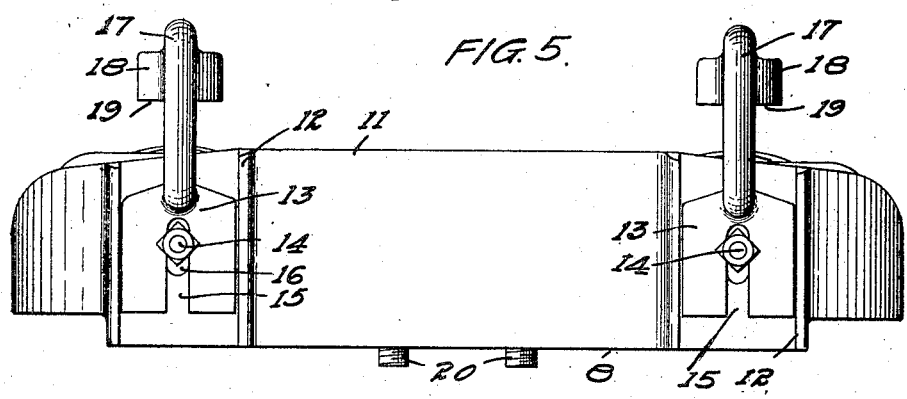

UNITED STATES PATENT OFFICE.

WILBUR F. DAY, OF ST. PAUL, MINNESOTA.

BURNER.

1,163,221.　　　Specification of Letters Patent.　　Patented Dec. 7, 1915.

Application filed July 9, 1915.　Serial No. 38,889.

*To all whom it may concern:*

Be it known that I, WILBUR F. DAY, citizen of the United States, resident of St. Paul, county of Ramsey, State of Minnesota, have invented certain new and useful Improvements in Burners, of which the following is a specification.

My invention relates particularly to liquid fuel burners adapted to be placed on the grate in a cook stove between the wall of the oven and the water front.

The object of my invention is to provide means for deflecting the flames from the burners upon the walls of the liquid fuel supply pipes, thereby hastening the generation of the gas.

A further object is to provide means to prevent the cold air entering through the base of the burner from contacting with and cooling the walls of the generator within the mixing chamber.

Other objects of the invention will appear from the following detailed description.

The invention consists generally in various constructions and combinations, all as hereinafter described and particularly pointed out in the claims.

Figure 1:
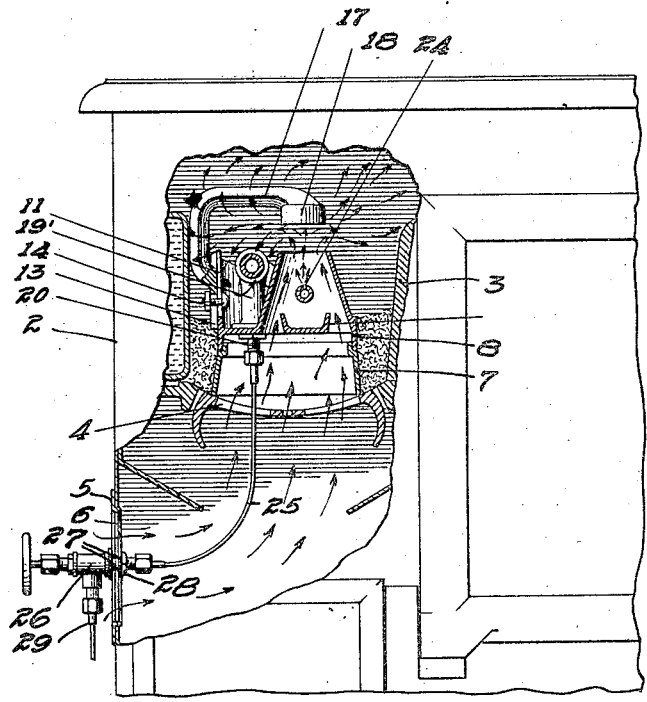
Figure 2:
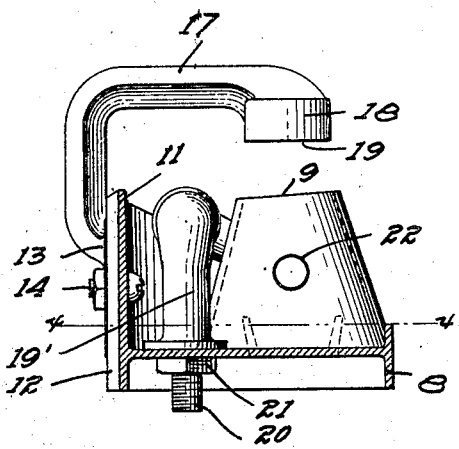
Figure 3:
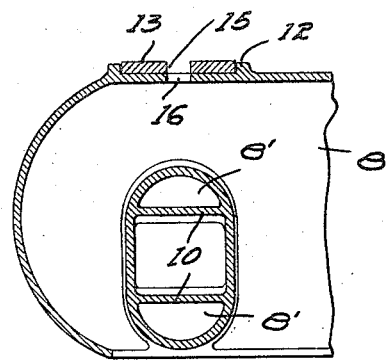

In the accompanying drawings forming part of this specification, Figure 1 is a view, partially in section, through a grate and oven wall and the draft slide of the stove, illustrating the application of my invention thereto. Fig. 2 is a sectional view of the burner, Fig. 3 is a horizontal sectional view of one end of the burner on line x—x of Fig. 2, Fig. 4 is a plan view of the burner, Fig. 5 is a side elevation, partially in section, of the burner, Fig. 6 is a front elevation, partially in section, of the burner.

In the drawing, 2 represents a stove having an oven wall 3, grate 4, and draft slide 5, provided with openings 6 therein.

7 is a base, preferably of cast metal placed upon the grate and on which the base 8 of the burner proper is seated. The base 8 is imperforate, except for air intake ports 8' arranged in pairs and communicating with the mixing chamber 9, a wall 10 being provided between the intake ports of each pair to deflect the air currents outwardly against the walls of the mixing chamber and prevent them from contacting with and cooling the walls of the generator. The base being imperforate except for these openings 8' and the space around the support 7 being covered with ashes or other suitable material, all the air entering the stove will be compelled to flow through the draft openings 8' to the mixing chambers. At the forward edge of the base I provide an upright wall 11 extending the full length of the base and preferably around the ends thereof and gradually decreasing in height at the ends. The wall is preferably provided on its outer surface with vertical parallel guides 12 between which slides 13 are arranged and secured by bolts 14 passing through slots 15 and 16 in said slides and wall. When these bolts are loosened, the plates 13 may be raised or lowered between the guides. Arms 17 are supported on the upper portion of the plates and extend upwardly and forwardly over the burner, terminating in heads 18 which are disposed above the open ends of the mixing chamber and have flat faces 19 forming spreaders to deflect the flames of the burning fuel outwardly on all sides of the burner.

The burner consists of two parts, each of which forms a complete individual burner and both of which are substantially the same in construction and the same reference numerals may be used to designate them.

The means for conducting the liquid fuel to the generator and mixing chamber consists preferably of cast standards 19' flanged at their lower ends and seated on the base 8 and provided with threaded extensions 20 depending through holes in the base 8 and secured by suitable means, such as lock nuts 21. The upper ends of the standards have elbows formed thereon and cast pipes in the form of goose necks are tapped at one end into the elbows and have their opposite ends fitting within holes 22 in the walls of the mixing chamber and extending across the chamber from side to side and forming retorts or generators. Ports 24 are formed in the walls of these generators through which the vapor or gas escapes to mingle with the air in the mixing chambers. I prefer to make these pipes for conducting the liquid fuel to the mixing chambers in the manner described on account of economy of construction and for the reason that the parts can be assembled and the generators inserted in the mixing chambers and the standards secured to the base easily and quickly and with comparatively little fitting or adjustment.

As shown in the drawings, the walls between the draft openings in the base protect the generator from the cold air, deflecting it against the walls of the mixing chambers, while the tapering form of the mixing chambers serves to draw the air currents inwardly above the generators where they will mingle with the gases flowing through the generator nozzles. In this way I am able to keep up the temperature of the generating chambers and prevent them from being affected by the incoming currents of cold air.

The upright wall at the front of the base operates as a baffle or deflector, turning the flames downwardly upon the fuel supply pipes and heating the walls of these pipes to assist in the gas generating operation. The construction of the wall at the ends of the burner also has a similar function with respect to those portions of the liquid fuel supply pipes adjacent to these walls.

The space around the base of the burner will be closed to the passage of air, as described, but will be open in front of the baffle wall or between it and the water front when the burner is used in a stove having a front. A fuel supply tube 25 is coupled to the extension of each standard on the base and has means for connection with valves 26 secured to the draft slide by washers 27 and lock nuts 28. A nipple 29 is connected to the valves 26 and leads to a suitable source of liquid fuel supply, not shown.

In the operation of the burner, the liquid fuel will flow through a suitable connection from the reservoir, not shown, to the nipple 29 and from thence be distributed by means of the valves 26 and connections to either burner, or both of them, if desired. Initial generation of the vapor is obtained by igniting oil around the mixing chamber, either by placing it in a suitable priming cup or sprinkling it upon a bed of ashes, and when the generation of the gas is started and there is ignition at the burner, the vaporization will be continued through the heat of the flame on the walls of the generator and on the walls of the ducts leading to the generator, being deflected thereupon by the baffle wall at the forward portion of the base.

The burner is extremely simple in construction and all the parts are accessible for convenience of adjustment or repairs.

I claim as my invention:

1. A burner comprising a base having a draft opening therein and a mixing chamber in the form of a truncated cone mounted on said base and encircling said opening, a generating chamber bridging the space in said mixing chamber, a wall also bridging said mixing chamber beneath said generator and dividing said air passage into comparatively narrow openings, said wall having means flaring upwardly and outwardly therefrom for deflecting the incoming currents of air against the walls of said mixing chamber and away from the walls of said generator.

2. A burner comprising a base and a substantially cone-shaped mixing chamber projecting upwardly therefrom and encircling a draft opening provided in said base, a wall extending horizontally across the middle portion of said draft opening and having upwardly and outwardly inclined flanged edges, there being comparatively narrow passages formed between said flanged edges and the walls of said mixing chamber, the inclined faces of said flanges directing the currents of air outwardly against the walls of said mixing chamber, and a generator extending across said mixing chamber above said wall and lengthwise thereof and out of the path of the air currents deflected by said flanged edges.

3. A burner comprising a base having a draft opening adjacent to one of its longitudinal edges and a mixing chamber in the form of a truncated cone surmounting said draft opening, a wall projecting upwardly from said base adjacent the other longitudinal edge thereof and spaced from the walls of said mixing chamber, a liquid fuel supply pipe mounted in said base adjacent to said upright wall and having a horizontal portion in the space between said wall and mixing chamber and adjacent the walls of the latter, said extension having an end portion which passes through the walls of said mixing chamber, for the purpose specified.

4. A burner comprising a base, a mixing chamber mounted thereon, a liquid fuel supply pipe comprising an upright standard mounted in said base, a goose neck having a connection at one end with said standard, the other end of said goose neck projecting through openings in the walls of said mixing chamber to form a generating chamber therein, the portion of said goose neck connected to said standard being adjacent to the wall of said mixing chamber and substantially below the level of the top thereof.

5. A burner comprising a base, a base plate having draft openings formed therein adjacent to one of said longitudinal edges, a wall projecting upwardly from the other longitudinal edge of said plate and extending from end to end thereof, mixing chambers encircling said draft openings and projecting upwardly therefrom, liquid fuel supply pipes mounted on said base between said draft openings and adjacent to said upright wall, and goose neck extensions having one end connected with said supply pipes and extending horizontally between said mixing chambers and said upright wall and their other ends passing through the walls of said mixing chamber to form generators therein.

6. A burner comprising a base, mixing chambers mounted thereon, a wall extending lengthwise of said base and around the end portions thereof, and liquid fuel supply pipes mounted on the middle portions of said base adjacent to said wall and extending upwardly from said base and having goose neck extensions running horizontally between said wall and mixing chambers and terminating in generators within said mixing chambers.

7. A burner comprising a base, a baffle wall extending upwardly from one of the longitudinal edges of said base and having a vertical guide formed therein, plates mounted to slide vertically in said guides and having means for securing them therein, an arm carried by said plates and extending upwardly and inwardly over said base, a spreader mounted on said arm, and a mixing chamber having an air intake opening and a gas generator arranged on said base beneath said spreader.

8. A burner comprising a base, mixing chambers mounted thereon, generators having fuel supply pipes communicating therewith and U-shaped, substantially, in form, a wall extending lengthwise of said base and projecting upwardly adjacent to said supply pipes and having curved continuations extending around the ends of said base adjacent to the curved portions of said supply pipes.

9. A burner comprising a base, mixing chambers mounted therein, generators having fuel supply pipes communicating therewith, and a wall extending lengthwise of said base and projecting upwardly, adjacent to said supply pipes and having curved continuations extending around the ends of said base adjacent to the walls of said supply pipes.

In witness, whereof, I have hereunto set my hand this 6th day of July, 1915.

WILBUR F. DAY.